Patented May 10, 1938

2,116,867

UNITED STATES PATENT OFFICE 2,116,867

GLUE, ADHESIVE, AND THE LIKE

Oscar R. Kreimeier and Robert W. Maxwell, Wilmington, Del., assignors to E. I. du Pont de Nemours & Company, Wilmington, Del., a corporation of Delaware No Drawing. Application April 11, 1934,
Serial No. 720,076

9 Claims. (Cl. 134—23.4)

The present invention relates to the manufacture of new derivatives of starch and certain other carbohydrates, to new and improved ethers of starch, and more particularly to the preparation of alkyl starch adhesives, glues, cements, pastes, and the like.

An object of the present invention is to provide a process for the preparation of new and improved etherified starches and certain other carbohydrates closely related thereto. Another object of the invention is to provide alkyl starch adhesives, pastes, glues, and the like. A further object of the invention is to provide a process for the preparation of methyl starch which involves the step of gelatinizing the starch grains prior to subjecting them to methylation. A still further object of the invention is to provide a process for the preparation of methyl starch wherein the methylating agent reacts on the non-gelatinized starch at comparatively low temperatures. Another object of the present invention is to provide new compositions of matter, particularly for use as adhesives, glues, and pastes containing from approximately 0.02 to 0.5 methyl group per $C_6H_{10}O_5$ starch group. Other objects and advantages of the invention will hereinafter appear.

In accord with the present invention starches or certain other carbohydrates, which will be more particularly identified hereinafter, are etherified to give highly useful products and particularly adhesives, pastes, glues, and the like, which contain from approximately 0.02 to 0.5 ether groups per $C_6H_{10}O_5$ starch group. Generally the reaction is conducted in the following manner, starch, for example, is treated either with or without gelatinization, with a small amount of the etherifying agent in the presence of an alkali such as the alkali, alkaline earth, or ammonium hydroxides, or carbonates. For example, if dimethyl sulfate is employed, as the etherifying agent, it is used in amounts ranging from approximately 0.02 to 0.75 mol. of the dimethyl sulfate per $C_6H_{10}O_5$ mol. of the starch, the methylation being effected in the presence of a small amount of alkali. As a result of the etherification an alkyl starch is obtained which contains in no case more than one-half an ether group per $C_6H_{10}O_5$ starch group.

The starches or primary materials which may be etherified in accord with the present invention include generally all carbohydrates, with the exception of cellulose, of the type $(C_6H_{10}O_5)_n$, and materials containing such carbohydrates, for instance, starch of all kinds, such as potato, corn, cassava, wheat, and rice starches, starch containing substances and materials, starchy fruits, starch flours, soluble starch, amorphous and crystallized starch (amylo-dextrin), alpha and beta amylan, dextrins of all kinds, inulin, geloses, and the like, as well as the hydrolyzed and oxidized starches, such as British gum, etc. In fact, any carbohydrates of a starchy or starch-like nature may be employed for the preparation of the etherified carbohydrates of the present invention, altho we prefer for optimum results to use corn, potato, rice, or cassava starches, and it appears that the methylated starches from such raw materials are exceptionally well adapted for the preparation of adhesives.

Altho methyl starch glues, pastes, cements, etc. prepared in accord with our process have many outstanding advantages over ordinary adhesives, other etherified starches may be prepared in accord with the invention and many of them have to a striking degree the outstanding characteristics of the methylated starches. For example, the etherification may be effected generally by treating the starch or other carbohydrates under conditions, hereinafter more particularly described, with the esters of inorganic acids, mixed ester salts of such acids, or halogen hydrins, halogen acids or their alkali salts, or substituted or unsubstituted ethylene oxides,—such as dimethyl sulfate, sodium methyl sulfate, methyl chloride, allyl chloride, crotyl chloride, and other suitable methylating agents or ethyl chloride, sodium ethyl sulfate, diethyl sulfate, dipropyl sulfate, methyl ethyl sulfate, and the higher symmetrical or unsymmetrical alkyl sulfates or mixtures of alkyl halides, such as methyl and ethyl chloride; chlorhydrine, ethylene chlorhydrine, glycerine chlorhydrine, sodium chloracetate, chloracetic acid, ethylene oxide, cyclohexene oxide, propylene oxide, and equivalent homologous compounds.

In the preparation of starch ethers in accord with the prior art, it is necessary in order to obtain a starch molecule with, for example, three alkyl groups per $C_6H_{10}O_5$ starch group, to effect the alkylation in the presence of in the order of 20 mols of a dialkyl sulfate per mol. of starch. We, on the other hand, have found that when alkylating in accord with this invention in order to obtain a low degree of alkylation no such ratio is required for ordinarily when alkylating with amounts of alkylating agents up to approximately 0.15 mol. per $C_6H_{10}O_5$ starch mol. an alkyl starch will be obtained having substantially the same fraction of an alkyl group per $C_6H_{10}O_5$ group as there were mols of alkylating agent per $C_6H_{10}O_5$ starch mol. used. Accordingly, in obtaining the low methylated starches for glues, adhesives, etc. in accord with the invention quantities of the dimethyl sulfate or other alkylating agent ranging from in the order of 0.02 to 0.75 mol. thereof per mol. of the starch being treated has been found usually adequate for the production of the methyl or other alkyl starches to give the products of this invention which quantities will, under conditions hereinafter disclosed, produce an alkyl starch containing 0.02 to 0.5 alkyl groups per $C_6H_{10}O_5$ group. This relationship substantially quantitatively holds with low degrees of etherification but under some conditions a slightly greater amount of alkylating agent is required for the higher degrees.

The methylation of starch generally requires, when using a salt of an alkyl sulfuric acid, such as sodium methyl sulfate and the like, a greater quantity and longer time to effect the same degree of alkylation than is required when the dialkyl sulfate is used for there is some indication that in many instances when alkylating with the dialkyl sulfate more than one of the alkyl groups becomes a substituent of the starch molecule and that more than an equivalent quantity of the salt of an alkyl sulfuric acid should be used, therefore, when substituting them for the dialkyl sulfate.

When alkylating starch to a low degree of alkylation, in accord with the invention, the manner and conditions of alkylation alter considerably the type of product resulting therefrom. For example, we have found that an adhesive type product, hereinafter designated as type I, which is very sticky and adherent, can be obtained by first gelatinizing the starch grains and then methylating with from 0.02 to 0.75 mol. of dimethyl sulfate per mol. of starch; by heating type I methyl starch to approximately 80° C. a much more adhesive product is made herein designated as type I—A; a paste, type II, methylated starch can be obtained by the methylation in the cold of a water suspension of ungelatinized starch grains with from 0.02 to 0.15 mol. of dimethyl sulfate per mol. of starch and subsequent to methylation, diluting and gelatinizing the starch; and an intermediate type III may be prepared by methylation of the ungelatinized starch grains at comparatively low temperatures and with from 0.15 to 0.75 mol. of dimethyl sulfate per mol. of starch.

These variously prepared methyl starches are adapted for various uses, for example, the adhesive type I is particularly well adapted for use as an adhesive, cement, and glue for use in the manufacture of ply wood, corrugated board, spiral wound paper tubing, wood veneer, etc., the paste type II for dispersing agent, thickening agent, dressing or size for paper or textiles, sticker for insecticides, etc. and the intermediate type III is well adapted for use as printing gum, size, etc.

The following are examples of the manner in which the process of making starch ethers and related compounds may be carried out, but the invention is not limited to the particular examples:

*Example 1.*—An adhesive, type I, methyl starch may be prepared by suspending (all parts are given in parts by weight) 162 parts of cassava or potato starch in 300 parts of water. After thorough mixing, 10 parts of caustic alkali dissolved in 150 parts of water is slowly added with stirring and the resulting mixture is heated to 80° C. It is then cooled and 16 parts of dimethyl sulfate are introduced with stirring and during this addition the temperature of the reaction is not allowed to exceed approximately 30° C. A type I adhesive is obtained which is a thick, fairly viscous, sticky mass, which may be used in this form or may be heated to 80° C. and upon subsequent cooling a much more adhesive product with lower viscosity, type I—A, results.

*Example 2.*—A paste, type II, material is obtained by suspending approximately 80 parts of corn starch in 80 parts of water to which suspension is added approximately 6.3 parts of dimethyl sulfate and after thorough incorporation a caustic solution, prepared by dissolving 2 parts of caustic in 40 parts of water, is added gradually over a period of four hours, care being exercised that no large excess of the unreacted caustic be present at any time, and that the temperature during the addition of the caustic be not permitted to rise above approximately 25° C. The resulting product may be employed as produced or water may be added to give any desired lower concentration and the methyl starch gelatinized by heating to a temperature of approximately 80° C.

*Example 3.*—An intermediate, type III, methyl starch having some of the characteristics of the adhesive, type I, and some of the characteristics of the paste, type II, may be prepared by suspending 162 parts of corn starch in 162 parts of water; to this suspension with stirring is added 40.5 parts of dimethyl sulfate. There is slowly added to the mixture an alkali solution prepared by dissolving 10 parts of sodium hydroxide in 81 parts of water. The addition of the caustic should be made in a manner similar to that disclosed in the above example, the temperature of the reaction mass being maintained below 25° C. and the addition requiring approximately 6 hours. This intermediate, type III, product may be used as produced or the methyl starch gelatinized with or without the addition of water by raising to a temperature of approximately 80° C.

If desired, the above described products may be used as prepared, altho in some instances it may be desirable to further purify them. This purification may be effected by precipitating the methyl starches from solution by use of lower aliphatic alcohols or other suitable non-solvents therefor. For example, the adhesive, type I, methyl starch may be diluted with an equal volume of water, to which methanol is subsequently added with stirring until the methyl starch precipitates. The supernatant liquid is decanted, another equal volume of water added, and again the methyl starch precipitated with methanol. There results a fine white powder after drying, which may be converted into a more or less fluid adhesive by the addition of suitable quantities of water.

The paste, type II, methyl starch may be separated from the products of the reaction by simple settling and decantation; the intermediate, type III, can be fairly well purified by dilution with methanol to precipitate the methyl starch, decanting, again diluting with methanol, and drying the powder resulting from the last precipitation.

The extending power of the adhesive type methyl starches is most exceptional, for example, a water adhesive, type I, methyl starch containing 27% solids was found to cover effectively, in a mechanical pasting machine, from two to four times as much surface as a commercial inexpensive adhesive containing 60% water. Furthermore, besides the unusual advantage derived from spreading ability, there are the advantages of absence of alkali stains present in some adhesives now used commercially and likewise due to the variation in consistency which is possible to impart to the methyl starch it can be readily adapted for application in many pasting and labeling machines. Other uses for which it is well adapted include household adhesives, dispersing agents, printing gum, thickening agents, sticker for insecticides, etc.

Undried methyl starches and particularly those having the low degree of methylation provided by the present application will ferment almost as readily as unmethylated starches of the same moisture content. It is advisable, therefore, either to incorporate in the methyl starch solution an inhibitor such, for example, as borax, boric acid, copper sulfate, camphor, and the like, or to cover the surface of the methyl starch with a liquid such as toluene, benzol, and the like, to prevent inoculation.

We have found further that it is not usually of advantage to use appreciably more alkali, than alkylating agent, and we generally prefer to employ from approximately $\frac{1}{5}$ to $\frac{1}{4}$ mol. of alkali per mol. of starch. By this means we are able to prepare a more highly viscous adhesive than is prepared by the use of strong caustic.

Any modification of or improvement in the process for the preparation of starch ethers made in accord with the present invention will come within its scope without sacrificing any of the advantages that may be derived therefrom.

We claim:

1. In a process of preparing glues, pastes, adhesives, and the like by the alkylation of a starch in the presence of an alkali, the steps which comprise preparing a water suspension of a starch, introducing into the resulting suspension from 0.02 to 0.75 mol. of a dialkyl sulfate per $C_6H_{10}O_5$ mol. of starch the alkyl group of said dialkyl sulfate containing one or two carbon atoms, and subsequently gradually adding alkali at such a rate that no large excess of unreacted alkali is present at any time, to the resulting mixture in the cold until substantially all of the alkylating agent has reacted with the starch.

2. A process as claimed in claim 1 characterized in that the product obtained is diluted with water to approximately 10% concentration and gelatinized by heating.

3. In a process of preparing glues, pastes, adhesives, and the like by the methylation of a starch in the presence of an alkali, the steps which comprise preparing an aqueous suspension of a starch, adding to the resulting mixture from 0.02 to 0.75 mol. of dimethyl sulfate per $C_6H_{10}O_5$ mol. of starch, and subsequently gradually adding the caustic alkali at such a rate that no large excess of unreacted alkali is present at any time, until substantially all of the dimethyl sulfate has reacted with the starch the methylation being effected at a temperature not substantially above 25° C.

4. A process as claimed in claim 1 characterized in that the starch is methylated with 0.02 to 0.15 mol. of dimethyl sulfate per $C_6H_{10}O_5$ mol. of starch.

5. A process as claimed in claim 1 characterized in that the starch is methylated with 0.15 to 0.75 mol. of dimethyl sulfate per $C_6H_{10}O_5$ mol. of starch.

6. A process as claimed in claim 3 characterized in that the product is diluted with water to approximately 10% concentration and gelatinized by heating.

7. In a process of preparing glues, pastes, adhesives, and the like by the alkylation of a starch in the presence of an alkali, the steps which comprise preparing a water suspension of a starch, introducing a dialkyl sulfate, in which the alkyl group does not contain more than two carbon atoms, into the resulting solution and subsequently in the cold gradually adding alkali, at such a rate that no large excess of unreacted alkali is present at any time, until from 0.02 to 0.5 mol. of the alkyl group is introduced per $C_6H_{10}O_5$ mol. of the starch.

8. The process as claimed in claim 1 characterized in that the product is diluted with water and gelatinized by heating.

9. The process as claimed in claim 1 characterized in that starch after alkylation is gelatinized by heat.

OSCAR R. KREIMEIER.
ROBERT W. MAXWELL.